United States Patent
Pavithran et al.

(10) Patent No.: US 11,454,394 B2
(45) Date of Patent: Sep. 27, 2022

(54) SYSTEM AND METHOD FOR PREDETERMINING THE ONSET OF IMPENDING OSCILLATORY INSTABILITIES IN PRACTICAL DEVICES

(71) Applicant: Indian Institute of Technology Madras (IIT Madras), Chennai (IN)

(72) Inventors: Induja Pavithran, Chennai (IN); Vishnu Rajasekharan Unni, Chennai (IN); Raman Pillai Indusekharan Nair Sujith, Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 52 days.

(21) Appl. No.: 16/633,650

(22) PCT Filed: Jul. 22, 2019

(86) PCT No.: PCT/IN2019/050533
§ 371 (c)(1),
(2) Date: Jan. 24, 2020

(87) PCT Pub. No.: WO2020/021563
PCT Pub. Date: Jan. 30, 2020

(65) Prior Publication Data
US 2021/0131663 A1    May 6, 2021

(30) Foreign Application Priority Data

Jul. 23, 2018  (IN) .............................. 201843027574

(51) Int. Cl.
*G01M 15/14*    (2006.01)
*F23N 5/16*    (2006.01)
(Continued)

(52) U.S. Cl.
CPC ................. *F23N 5/16* (2013.01); *G01H 3/10* (2013.01); *G01M 15/14* (2013.01);
(Continued)

(58) Field of Classification Search
CPC ... F23N 5/16; G01H 3/10; G01H 1/00; G01H 1/003; G01M 15/14; F01D 21/003;
(Continued)

(56) References Cited

U.S. PATENT DOCUMENTS

| | | | |
|---|---|---|---|
| 5,784,300 A * | 7/1998 | Neumeier ................. | F23N 5/16 702/191 |
| 6,522,991 B2 * | 2/2003 | Banaszuk ................. | F23N 5/16 60/773 |

(Continued)

*Primary Examiner* — Freddie Kirkland, III (57) ABSTRACT

A system for early detection of onset of oscillatory instabilities in practical devices is described. The system consists of a measuring device (102), an instability detection unit (104) and a control unit (106). The measuring device (102) is configured to generate signals corresponding to the dynamics happening inside the practical device. The instability detection unit (104) along with an amplitude estimation unit (130) is configured to diagnose the stability of the practical device from the signals that are generated by the measuring device (102). Further, the control unit (106) is configured to control various operating parameters in the practical device based on the information obtained from the instability detection unit (104).

23 Claims, 7 Drawing Sheets

(51) Int. Cl.
*G01H 3/10* (2006.01)
*F01D 21/00* (2006.01)

(52) U.S. Cl.
CPC ...... *F01D 21/003* (2013.01); *F05D 2260/964* (2013.01); *F05D 2270/80* (2013.01); *F23R 2900/00013* (2013.01)

(58) Field of Classification Search
CPC .......... F05D 2260/964; F05D 2270/80; F05D 2270/44; F23R 2900/00013
See application file for complete search history.

(56) References Cited

U.S. PATENT DOCUMENTS

| | | | | |
|---|---|---|---|---|
| 7,751,943 | B2* | 7/2010 | Bollhalder | F23N 5/16 700/304 |
| 9,157,376 | B2* | 10/2015 | Sherman | F02C 9/54 |
| 9,176,002 | B2* | 11/2015 | Sherman | G01H 1/00 |
| 9,804,054 | B2* | 10/2017 | Vinod | G01M 13/028 |
| 10,095,247 | B2* | 10/2018 | Unni | G05B 23/0289 |
| 10,895,382 | B2* | 1/2021 | Unni | F23R 3/00 |
| 2006/0266045 | A1* | 11/2006 | Bollhalder | F23N 5/242 60/725 |
| 2015/0260609 | A1* | 9/2015 | Vinod | F02D 41/1498 702/56 |

* cited by examiner

SYSTEM AND METHOD FOR PREDETERMINING THE ONSET OF IMPENDING OSCILLATORY INSTABILITIES IN PRACTICAL DEVICES

FIELD OF INVENTION

The embodiments herein relate to a system and a method for predetermining the onset of impending oscillatory instabilities and estimating the amplitude of the oscillations in practical devices, and more particularly but not exclusively to a system and a method for predetermining the onset of impending oscillatory instabilities in devices such as high Reynolds number flow or combustion devices and/or noisy acoustic devices, and controlling various parameters of the device in order to prevent the device from oscillatory instabilities. The present application is based on, and claims priority from an Indian Application Numbers PCT/IN2019/050533 filed on 22 Jul. 2019, 201843027574 filed on 23 Jul. 2018, 4110/CHE/2012 filed on 1 Oct. 2012 and 4476/CHE/2012 filed on 26 Oct. 2012, PCT Application number PCT/IN2013/000197 filed on 26 Mar. 2013, the disclosure of which is hereby incorporated by reference herein.

BACKGROUND OF INVENTION

Controlling oscillatory instabilities is very important in many devices that are being used in various fields because such oscillations lead to a decreased performance and reduced lifetime of such devices. In devices such as combustors that are used in gas turbines, jet engines, and industrial processing devices such as furnaces and burners, controlling and avoiding the oscillatory instability remains a challenging task as these devices are driven by a variety of flow and combustion processes.

Further, in these devices, oscillatory instabilities may arise easily as only a small fraction of the energy available to the system is sufficient to drive such instabilities and the corresponding attenuation in the device is weak. Hence, large amplitude pressure oscillations are easily established in these devices resulting in performance losses, reduced operational range and structural degradation due to increased heat transfer. Further, detection of the onset of oscillatory instabilities remains a challenging task in other fields as well; for example, flow induced vibrations due to aeroelastic instabilities and pipe tones arising due to aero acoustic instabilities.

Researchers have proposed various techniques to control oscillatory instabilities occurring in practical systems such as combustors and turbomachinery, some of which are listed below. In one of the proposed techniques, a delay feedback controller is used with the combustors. The delay feedback controller modifies the pressure in the fuel line to control instabilities. Although, the technique of using delay feedback controller is partially successful in controlling instabilities in combustors, it should be noted that this technique may not be amenable to most fielded systems as it requires external actuators, modification of combustor configuration and knowledge of frequency response for an arbitrary input. Further, the instability can be controlled only after the instability occurs and thus the technique fails to prevent the instability.

In another conventional technique, the combustor stability is determined based on the bandwidth of the combustor casing vibration and dynamic pressure measurements in combustion chambers. The bandwidth which is indicative of the damping, decreases towards zero as the combustors approach the stability limits. However, the presence of noise in the combustion chamber could make this technique partially inefficient, as it relies on frequency domain analysis.

In yet another conventional technique, the stability margin of combustors is determined using exhaust flow and fuel injection rate modulation. However, this technique is again restricted by the need for acoustic drivers and pulsed fuel injectors. Another conventional technique proposed a detector that utilizes autocorrelation of the acquired signal to characterize the damping of the combustor. The instability of the combustor is tracked by the detector when the damping goes to zero. This technique again requires the combustor to reach instability for the detector to work. Further, the technique may not be effective for combustors exhibiting pulsed instabilities and noise induced transition to instability. In addition, the presence of multiple frequencies in the spectrum makes the concept of damping unclear.

In order to avoid combustion instabilities, combustor designers incorporate sufficient stability margin in the design of the combustor. The stability margins prevent instabilities from occurring even in the worst possible scenario. However, such conservative estimates on operational regimes lead to increased levels of $NO_x$ emissions making it more difficult to meet the demanding emission norms.

In yet another conventional technique, aerodynamic and aeromechanical instabilities in turbofan engines are detected using a sensor positioned in the compressor portion of the engine which generates a precursor signal to instability after passing through a carefully selected bandpass and filter. This approach to detect instability is problematic due to similar issues discussed in the previous systems.

Thus, the conventional techniques for controlling the oscillatory instabilities require either incorporation of certain design features in the device or the incorporation of sensors or similar detectors that could detect the instability and control the instability. Further, both the processes are directed to identifying the instability after the instability occurs. Hence, there exists a need for a system and a method that could predetermine the instability and control various parameters of the device accordingly, to prevent the system from entering an operational regime where it becomes unstable, thus improving the stability margins.

OBJECT OF INVENTION

The principal object of this invention is to provide a system for early detection of the onset of oscillatory instabilities in practical devices.

Another object of this invention is to provide a system for early detection of the onset of oscillatory instabilities in practical devices, and controlling various parameters of the device in order to prevent the device from developing oscillatory instabilities.

A further object of this invention is to provide methods for early detection of the onset of oscillatory instabilities in practical devices.

Yet another object of this invention is to provide methods for early detection of the onset of oscillatory instabilities in practical devices, and controlling various parameters of the device in order to prevent the device from entering an operational regime where oscillatory instabilities exist.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications maybe made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of the ways in which the embodiments may be practiced and to further enable those of skill in the art to practice the embodiments. For example, although, certain embodiments herein are related to the system and method for early detection of instabilities in devices such as combustors in gas turbines, and industrial processing devices such as furnaces and burners for the ease of understanding the invention, it should be noted that the system according to the present invention may also be used for any other devices in which the transition to oscillatory instability from chaotic behavior happens though intermittent bursts. Further, although, certain embodiments herein are related to the system and method for detecting and preventing oscillatory instabilities in combustion systems, it should be noted that the system and method according to the present invention could also be used for preventing oscillatory instability in any noisy or chaotic systems; for example, structural instabilities that may arise due to aeroelastic flutter or flow induced vibration, aerodynamic and aeromechanical instabilities such as surge and, or instabilities arising in magnetohydrodynamics, or aeroacoustic instabilities in gas transport systems exhibiting pipe tone instabilities. Furthermore, although, certain embodiments herein are related to the systems and methods that utilizes faster and more robust techniques of burst counting and Hurst exponent methods for early detection of onset of instabilities, it should be noted that the system could utilize any other methods that could determine the transition to instability through intermittent burst in a smooth manner. Accordingly, the examples should not be construed as limiting the scope of the embodiments herein.

The embodiments herein achieve a system and method for determining the oscillatory instabilities in practical devices, before the instability occurs. Further, the embodiments herein achieve a system and method for predetermining the oscillatory instabilities in practical devices and controlling various parameters of the device in order to prevent the device from oscillatory instabilities. Further, the embodiments herein achieve a system and method for early detection of onset of oscillatory instabilities in devices where the transition to oscillatory instability from chaotic or noisy behavior happens though intermittent bursts, and controlling various parameters of the device in order to prevent the device from developing oscillatory instabilities. Referring now to the drawings, and more particularly to FIGS. 1 to 9, embodiments are shown where similar reference characters denote corresponding features consistently throughout the figures.

Figure 1:
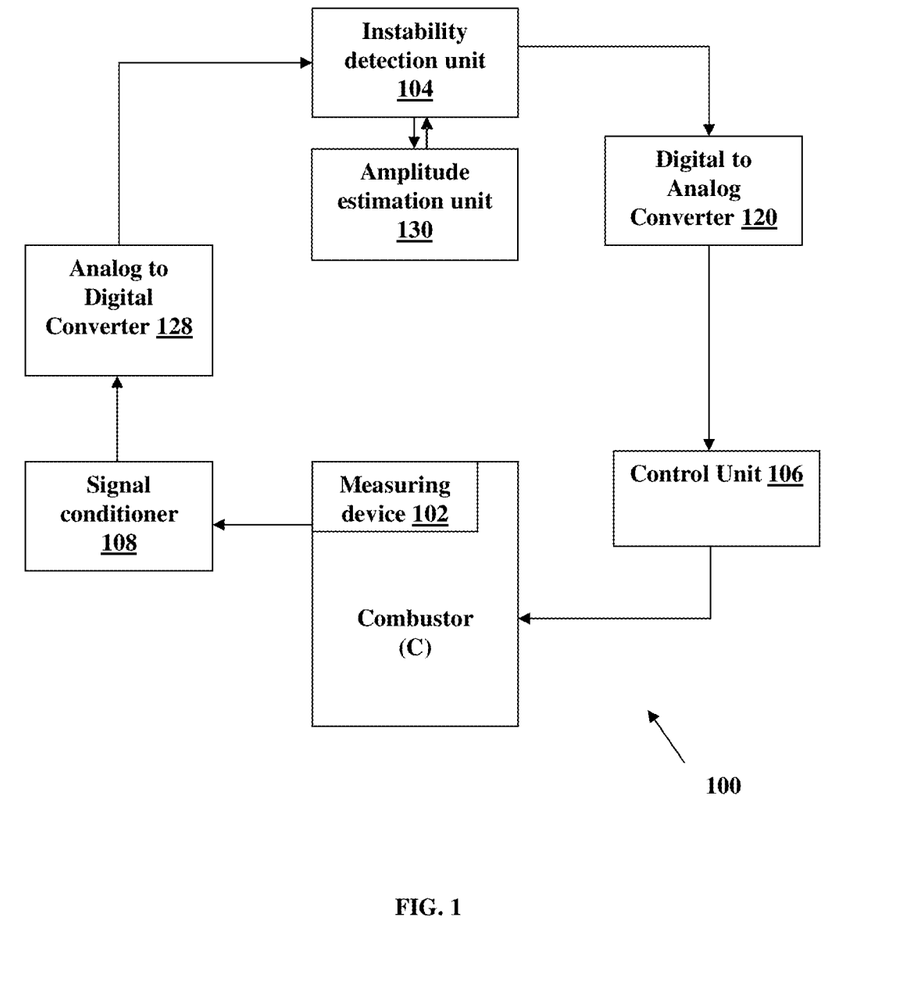
FIG. 1 is a block diagram of a system for early detection of onset of impending instabilities in practical devices, according to embodiments as disclosed herein.

FIG. 1 is a block diagram of a system 100 for early detection of instabilities in a practical device. In an embodiment, the system 100 is configured to detect instabilities in devices such as combustors (C) in gas turbines, and industrial processing devices such as furnaces and burners. However, it is also within the scope of invention, that the system 100 could be used for any other device that encounters unwanted oscillatory instabilities without otherwise deterring the intended function of the system 100 as can be deduced from this description. The system 100 includes a measuring device 102, an instability detection unit 104, an amplitude estimation unit 130 and a control unit 106. The measuring device 102 is configured to acquire signals corresponding to the dynamics happening inside the combustor (C). In an embodiment, the measuring device 102 is configured to acquire acoustic signals corresponding to the dynamics happening inside the combustor (C). In an embodiment, the measuring device 102 is provided in communication with the combustor (C) or any other device that has to be prevented from oscillatory instabilities. The instability detection unit 104 is configured to diagnose the stability of the combustor (C) from the signals ($\Phi(j)$) that are generated by the measuring device 102. The amplitude estimation unit 130 is configured to estimate the amplitude of the impending oscillatory instability. The control unit 106 is configured to control various operating parameters in the combustor (C) based on the information obtained from the instability detection unit 104.

In another embodiment, the system 100 also includes a signal conditioner 108, an analog to digital convertor 128 and a digital to analog convertor 120. The signal conditioner 108 is configured to manipulate the signal ($\Phi(j)$) generated by the measuring device 102, such that it meets the requirements of analog to digital convertor 128. In an embodiment, the signal conditioner 108 is configured to amplify the signal ($\Phi(j)$) generated by measuring device 102. Further, if the signal ($\Phi(j)$) obtained from the measuring device 102 is analog, the analog to digital convertor 128 coverts the analog signal to digital signal such that the signals ($\Phi(j)$) could be processed in the instability detection unit 104 and in turn in the amplitude estimation unit 130. Further, the digital to analog convertor 120 converts the digital signal obtained as the output from instability detection unit 104 to an analog signal such that it could be processed by the control unit 106.

It should be noted that the aforementioned configuration of system 100 is provided for the ease of understanding of the embodiments of the invention. However, certain embodiments may have a different configuration of the components of the system 100 and certain other embodiments may exclude certain components of the system 100. Therefore, such embodiments and any modification by addition or exclusion of certain components of system 100 and without otherwise deterring the intended function of the system 100 as is apparent from this description and drawings are also within the scope of this invention.

In an embodiment, the instability detection unit 104 diagnoses whether the dynamics of the combustor is chaotic/noisy or non-chaotic/periodic, based on the signals $\Phi(j)$ generated by the measuring device 102 as a time series. A mathematical method described as 0-1 test in the literature can be used to identify the presence of chaos in a given time series. The instability detection unit 104 encapsulates a fundamentally new and heretofore unexplored application of the test as a tracker of oscillatory instabilities. The signal $\Phi(j)$ is measured such that the measured value at each instant provides essentially no information about future values when the combustor is in a stable operating condition. This is accomplished by configuring the instability detection unit 104 to sample the measured signal at a time interval corresponding to the first minimum of the average mutual information of the signal $\Phi(j)$. The average mutual information could be obtained as $$I(\tau) = \sum_{j=1}^{N} P(\Phi(j), \Phi(j+\tau)) \log_2 \left[ \frac{P(\Phi(j), \Phi(j+\tau))}{P(\Phi(j))P(\Phi(j+\tau))} \right]$$

where,

I represents the average mutual information.

$\tau$ represents the location of average mutual information.

$\Phi(j)$ represents the measured signal from combustor for j=(1, 2, ..., N)

P(S) represents probability of the event S.

Typically, the location of the first minimum of the average mutual information ($\tau_{min}$) is T/4, where T is the natural acoustic period of oscillations in the combustor. In an embodiment, although, the value of $\tau_{min}$ is prescribed, the instability detection unit 104 is robust for various values of the sampling interval as long as the consecutive values are poorly correlated. For example, comparable values of $\tau_{min}$ may also be obtained by using a sampling interval corresponding to the first zero crossing of the autocorrelation of $\Phi(j)$.

Further, from the measured signal $\Phi(j)$ for j=(1, 2, ..., N) and $j_{i+i}-j_i=\tau_{min}$, translation variables $p_c$ and $q_c$ is obtained as, $$p_c(n) = \sum_{j=1}^{n} \Phi(j)\cos(jc)$$

$$q_c(n) = \sum_{j=1}^{n} \Phi(j)\sin(jc)$$

where c is chosen randomly in the interval ($\pi/5$, $4\pi/5$). The diffusive (or non-diffusive) behavior of $p_c$ and $q_c$ can be investigated by analyzing the mean square displacement $M_c(n)$. If the dynamics is regular then the mean square displacement is a bounded function in time, whereas if the dynamics is chaotic then the mean square displacement scales linearly with time. The mean square displacement $M_c(n)$ of the translation variables could be computed as $$M_c(n) = \lim_{N \to \infty} \frac{1}{N} \sum_{j=1}^{n} [p_c(j+n) - p_c(j)]^2 + [q_c(j+n) - q_c(j)]^2$$

Note that this definition requires n<<N, where N represents the size of the measured signal. Further, the limit is assured by calculating $M_c(n)$ only for $n \leq n_{cut}$ where $n_{cut}$<<N. In practice, we find that $n_{cut}$=N/10 yields good results, where $n_{cut}$ represents the value of the index up to which mean square displacement $M_c(n)$ is calculated. The test for chaos is based on the growth rate of $M_c(n)$ as a function of n. Hence, in order to formulate a modified mean square displacement $D_c(n)$ which exhibits the same asymptotic growth as $M_c(n)$ but with better convergence properties, the instability detection unit 104 is configured to remove the oscillatory term $V_{osc}(c, n)$ from the mean square displacement $M_c(n)$. The modified mean square displacement $D_c(n)$ could be obtained as $$D_c(n) = M_c(n) - V_{osc}(n)$$

where $$V_{osc}(c, n) = (E\Phi)^2 \frac{1 - \cos(nc)}{1 - \cos(c)}$$

and $$E\Phi = \lim_{N \to \infty} \frac{1}{N} \sum_{j=1}^{n} \Phi(j)$$

Hence, by defining vectors $\xi=(1, 2, \ldots, n_{cut})$ and $\Delta=(D_c(1), D_c(2), \ldots, D_c(n_{cut}))$, the asymptotic growth rate $K_c$ of the modified mean square displacement $D_c$ with n could be obtained from the correlation of the vectors $\xi$ and $\Delta$. Normally, the value of $K_c$ essentially allows the user of the system 100 to distinguish between the chaotic and non-chaotic dynamics of the combustor. The asymptotic growth rate $K_c$ is a function of c for regular and chaotic dynamics. In the case of periodic dynamics, most values of c yield $K_c=0$ as expected, but there are isolated values of c for which $K_c$ is large. Therefore, to ensure robustness of the measure to outliers and spurious resonances, the median value of $K_c$ (say K) is obtained for different random values of c.

Figure 2:
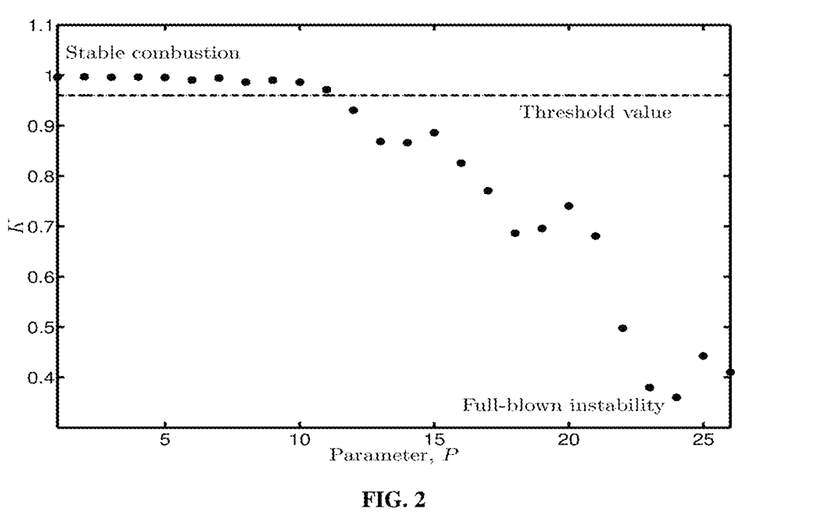
FIG. 2 is a graph depicting a measure based on the 0-1 test applied on the dynamic pressure data obtained from a combustor (C) in a particular configuration as the parameters are moved towards instability, according to embodiments as disclosed herein.
Figure 3:
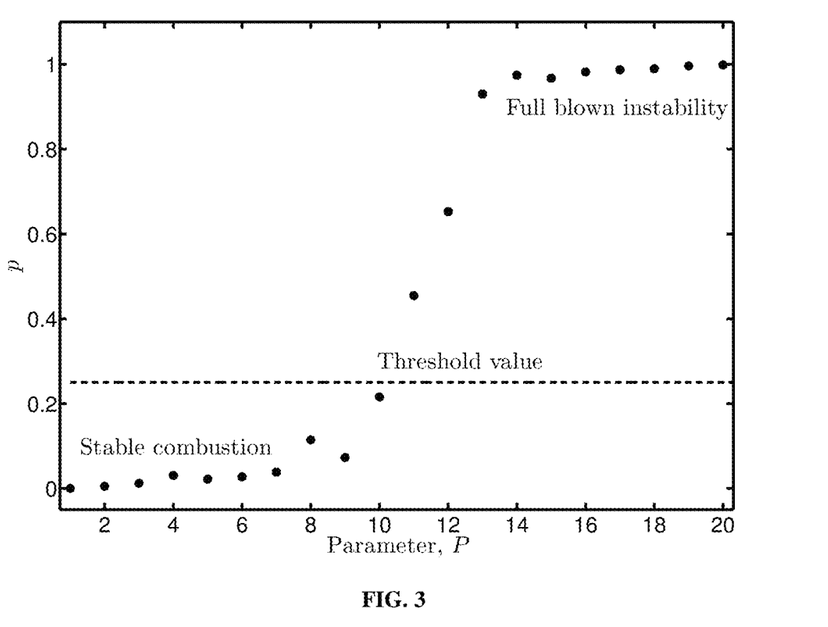
FIG. 3 is a graph depicting a measure based on the number of peaks crossing a set threshold value applied on the dynamic pressure data obtained from a combustor (C) in a particular configuration as the parameters are moved towards instability, according to embodiments as disclosed herein.
Figure 4:
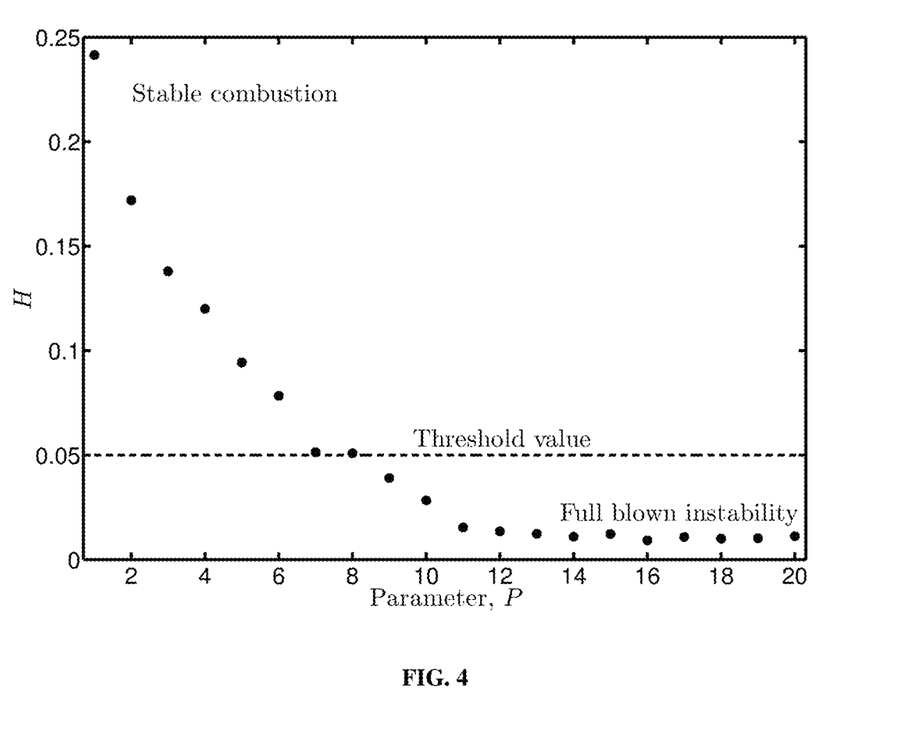
FIG. 4 is a graph depicting a measure based on the Hurst exponent test applied on the dynamic pressure data obtained from a combustor (C) in a particular configuration as the parameters are moved towards instability, according to embodiments as disclosed herein.
Figure 5:
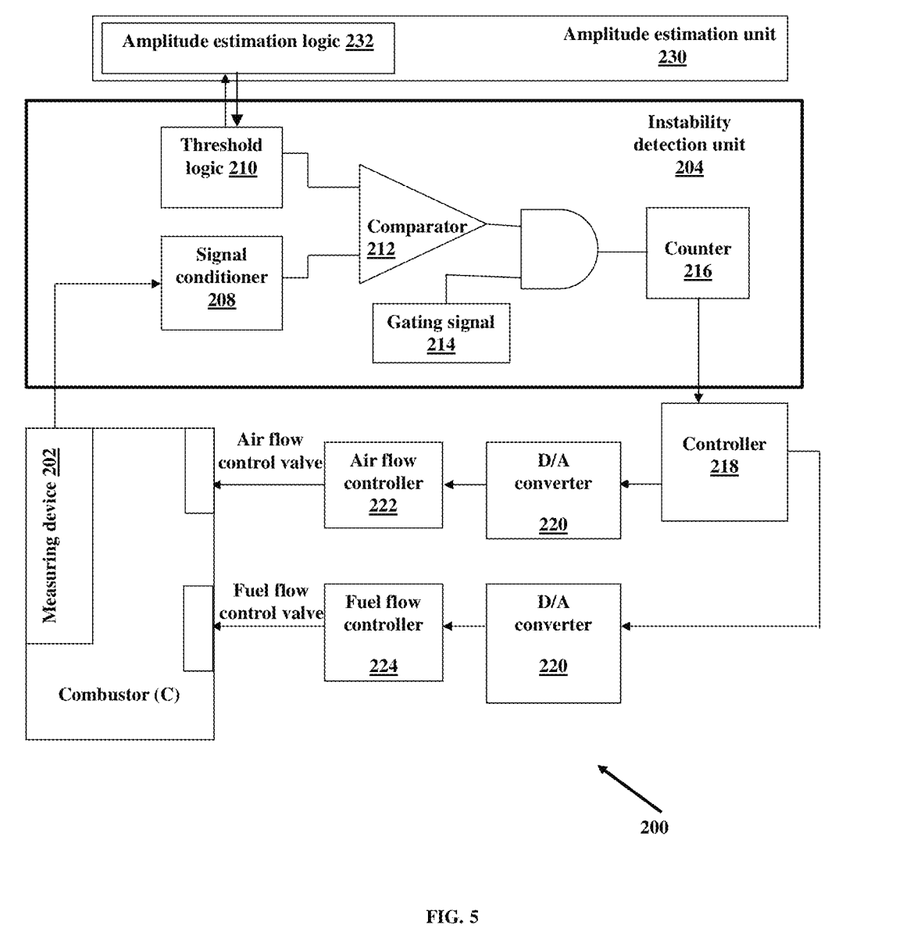
FIG. 5 is the schematic of the system used for the early detection of onset of instabilities in the combustor (C), by counting the bursts generated within the combustor (C), according to embodiments as disclosed herein.

The obtained value of K would lie close to 1 for noisy/chaotic signals and close to 0 for regular dynamics. Further, if the combustor flow field is inherently turbulent, the transition to instability would be associated with a decrease in the value of K from 1 to a lower value depending on the turbulent intensity; i.e., higher the intensity of turbulence at instability, higher the departure of K from 0 at instability. Hence, a threshold value of K may be defined upon crossing of which a suitable control unit 106 may be configured to control various parameters of the combustor and maintain the combustor under stable operating conditions. FIG. 2 is a graph showing the results of the instability detection unit based on this test applied on the dynamic pressure data obtained from a combustor in a particular configuration as the parameters are moved towards oscillatory instability. FIG. 3 is a graph depicting a measure based on the number of peaks crossing a set threshold value applied on the dynamic pressure data obtained from a combustor (C) in a particular configuration as the parameters are moved towards instability. FIG. 4 is a graph depicting a measure based on the Hurst exponent test applied on the dynamic pressure data obtained from a combustor (C) in a particular configuration as the parameters are moved towards instability FIG. 5 is the schematic of the system 200 used for the early detection of onset of instabilities in the combustor (C), by counting the bursts generated within the combustor (C). The system 200 is provided with a unit for the early detection of onset of instabilities by explicitly tracking the intermittent bursting behavior preceding the transition to instability from chaos. The system 200 includes a measuring device 202, an instability detection unit 204 and a control unit 218. The measuring device 202 is configured to generate signals ($\Phi(j)$) corresponding to the dynamics happening inside the combustor (C). In an embodiment, the measuring device 202 is configured to generate acoustic signals corresponding to the dynamics happening inside the combustor (C). In an embodiment, the measuring device 202 is provided in communication with the combustor (C) or any other device that has to be prevented from oscillatory instabilities. The instability detection unit 204 is configured to diagnose the stability of the combustor (C) from the signals ($\Phi(j)$) that are generated by the measuring device 202. In an embodiment, the instability detection unit 204 is a programmed unit that requires the sampling rate ($F_s$) for which the signal $\Phi(j)$ is obtained. In an embodiment, the signal $\Phi(j)$ could be acquired by fixing $F_s=10F_{max}$, (where $F_{max}$ is the maximum frequency one wishes to prevent), as any device generally starts the operation at a stable condition. The sampling rate ($F_s$) at which the signal $\Phi(j)$ can be acquired is related to the location of the first minimum of average mutual information ($\tau_{min}$).

After computing $\tau_{min}$, the sampling rate ($F_s$) at which the signal $\Phi(j)$ is acquired could be then revised as $F_s=10/\tau_{min}$. By fixing the sampling rate ($F_s$) the system could be optimized for precursor detection. It should be noted that the aforementioned procedure for obtaining $\tau_{min}$ and $F_s$ is provided for the ease of understanding of an embodiment of the invention. Further, although the aforementioned values of $\tau_{min}$ and $F_s$ are prescribed, it should be noted that the detection techniques utilized in the system 100 as disclosed in this description are robust for changes in these quantities within a reasonable range.

The system 200 includes at least one sensor. The sensor is configured to acquire signal from the device (combustor (C)) to which the system 200 is incorporated. The acquired signal then reaches the instability detection unit 204 where the proximity of the operating condition to instability is determined. Further, the instability detection unit 204 is configured to generate appropriate signals corresponding to the instability and transfers the signals to the control unit 218.

The controller 218 is configured to control various operating parameters in the combustor (C) based on the information obtained from the instability detection unit 204. In an embodiment, a suitable threshold is set for the number obtained by the instability detection unit 204, such that when the threshold is crossed, the control unit 218 suitably ensures that the combustor (C) remains in stable operating conditions, by controlling various parameters in the combustor (C), thereby increasing the stability margin of the combustor (C).

The instability detection unit 204 diagnoses the onset of instabilities in the device (combustor (C)) to which the system 200 is incorporated and provides a signal to the amplitude estimation unit 230 to estimate the amplitude of the oscillations during instability, by examining the bursts generated within the device prior to instability. Bursts refer to a sudden spike in the amplitude of the measured signal which decays after a short duration. The occurrence of such bursts in the measured signal leads to an intermittent switching behavior of the signal between low and high amplitudes. This is often the case in high Reynolds number flow devices where the transition to oscillatory instability from chaotic behavior happens through intermittent bursts. Such bursts are also common in systems with high levels of noise where the transition to instability happens through a region characterized by intermittent bursts.

In one embodiment, the onset of impending instabilities is determined by counting the number of peaks (N) in the signal $\Phi(j)$ above a user-defined threshold ($\xi$) for a time duration (t). The threshold ($\xi$) would correspond to the acceptable levels of amplitude of the device (combustor (C)). In an embodiment, the value of time duration (t) is defined as 400 $\tau_{MIN}$ and all the peaks ($N_{tot}$) that are generated within the time duration (t) are counted. In an embodiment, the time duration (t) would correspond to 100 oscillatory cycles in the device (combustor (C)) at full blown instability. For example, in a device such as combustor (C) with instability happening at 250 Hz, the sampling would be at 10 kHz for time duration of 400 ms. The probability of the operating condition becoming unstable can be defined as $$p=N/n_{tot}$$

The value of p is a measure of the proximity of the operating condition to instability. In an embodiment, the value of p smoothly increases towards 1 for an increase of the parameters towards instability. Further, the combustor (C) could be prevented from instability by activating the control unit 218 when the measured value of p exceeds a set threshold probability as required. In an embodiment, a suitable threshold is set for the probability of the combustor (C) to attain instability, such that when the threshold value is obtained, the control unit 218 suitably ensures that the combustor (C) remains in stable operating conditions, by controlling various control parameters in the combustor (C), thereby increasing the stability margin of the combustor (C). FIG. 3 is a graph showing the results of the instability detector unit based on counting the bursts in the unsteady pressure data obtained from the combustor in a particular configuration.

In an embodiment, the system 200 provided with a unit for early detection of onset of instabilities in the combustor (C), by counting the bursts generated within the combustor (C) includes a signal conditioner 208, threshold logic 210, a comparator 212, a gating signal 214, a counter 216, and a control unit 218 as shown in FIG. 5. The control unit 218 further includes at least one digital to analog converter 220, an air-flow controller 222 and a fuel flow controller 224. FIG. 5 is the system configuration used for early detection of onset of instabilities in the combustor (C), by counting the bursts generated within the combustor (C). The signal $\Phi(j)$ generated inside the combustor (C) is determined by means of appropriate sensors (not shown). Further, the signal conditioner 208 is configured to amplify the measured signal ($\Phi(j)$). The gating signal 214 generated by an internal gating circuit controls the time duration (t) of signal acquisition. The threshold logic 210 includes fixed threshold ($\xi$), such that when the threshold logic is applied on the gated signal, the peaks in the signal above the threshold ($\xi$) is determined. The comparator 212 is configured to compare the measured signal $\Phi(j)$ with the threshold ($\xi$) of the signal. Further, the counter 216 is configured to count the number of peaks in the signal $\Phi(j)$ above the threshold ($\xi$). In an embodiment, the occurrence of burst in the signal increases the amplitude of pressure signal beyond the threshold value and the threshold logic circuit generates a signal indicating the occurrence of peak above the threshold. Further, the counter 216 counts the number of peaks within the gating period (N) and transmits the information based on this number (N) to the control unit 218. The control unit 218 includes the air-flow controller 222 that is configured to regulate the functioning of the air flow control valve and the fuel flow controller 224 that is configured to regulate the functioning of the fuel flow control valve, one or both of which can be adjusted such that the combustor (C) is prevented from instabilities. In an embodiment, the signal generated by the control unit 218 is digital. Further, the digital to analog converter 220 is configured to convert the digital signal to analog signal for use in the air flow controller 222 and the fuel flow controller 224.

It should be noted that the aforementioned configuration of system 200 is provided for the ease of understanding of the embodiments of the invention. However, certain embodiments may have a different configuration of the components of the system 200 and certain other embodiments may exclude certain components of the system 200. Therefore, such embodiments and any modification by addition or exclusion of certain components of system 200 and without otherwise deterring the intended function of the system 200 as is apparent from this description and drawings are also within the scope of this invention. The amplitude estimation unit 230, uses the signals generated by the instability detection unit to in turn estimate the amplitude of the oscillations during instability before instability is approached using amplitude estimation logic 232.

In yet another embodiment, the onset of impending instabilities is determined by means of computing the Hurst exponent. For determining the Hurst exponent, the signal $\Phi(j)$ of length L is divided into a number (n) of non-overlapping segments ($x_i(j)$, i=1, 2, . . . , n) of equal span (w). Further, the mean of the signal is subtracted from these segments to obtain a cumulative deviate series as, $$m = \frac{1}{L}\sum_{j=1}^{L}\Phi(j)$$

$$y_i = \sum_{j=1}^{w}(x_i(j) - m)$$

Furthermore, in order to account for local trends in the segments, a local polynomial fit ($\bar{y}_i$) is made to the deviate series ($y_i$). The structure function ($S_w^q$) of order q and span w, is then obtained as:

$$S_w^q = \left(\frac{1}{w}\sum_{j=1}^{w}(y_i(j) - \bar{y})^q\right)^{\frac{1}{q}}$$

The Hurst exponent $H^2$ is then obtained as the slope of the linear regime in a log-log plot of $S_w^2$ for various span sizes. FIG. 4 is a graph depicting the variation in Hurst exponent of the unsteady pressure data obtained from the combustor (C) in a particular configuration for a change in control parameters. The Hurst exponent falls smoothly as the combustor (C) approaches instability. Instead of using the standard Hurst exponent $H^2$, the generalized Hurst exponent $H^q$ which would give similar trends as the standard Hurst exponent could also be used with the system.

Figure 6:
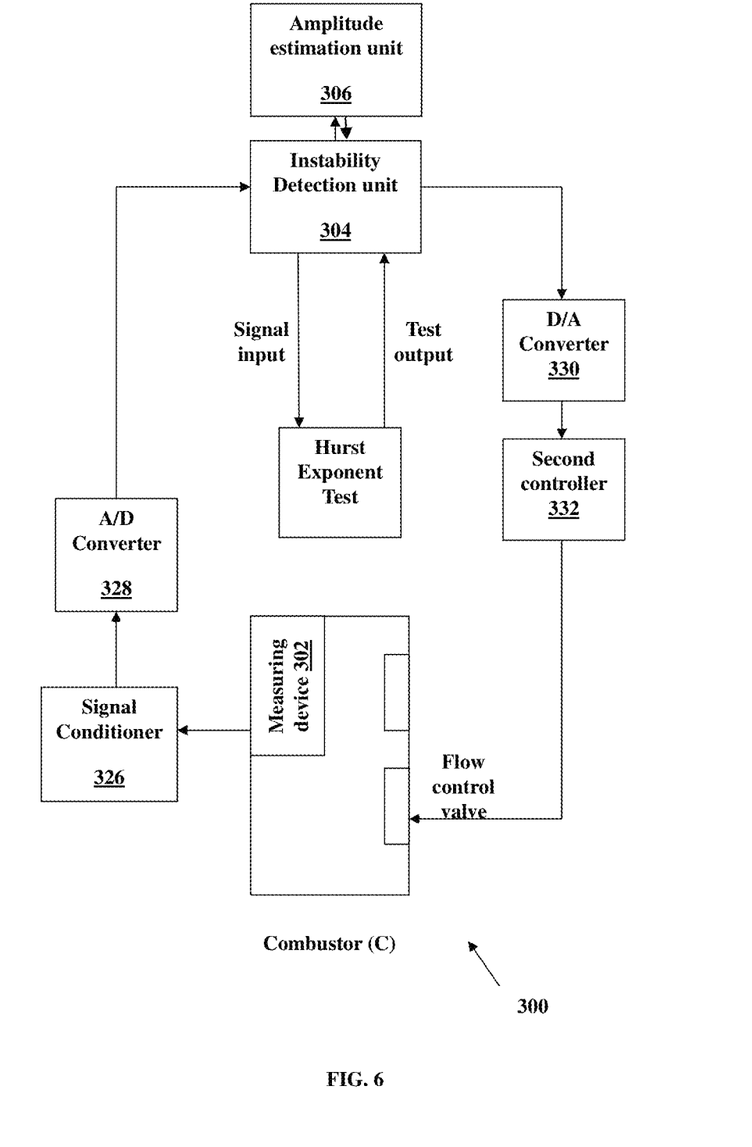
FIG. 6 depicts the schematic of the system for early detection of onset of instabilities in the combustor (C), by means of computing the Hurst exponent, according to embodiments as disclosed herein.

FIG. 6 depicts a system 300 for early detection of onset of instabilities in the combustor (C), by means of the Hurst exponent. In an embodiment, the system 300 for early detection of onset of instabilities in the combustor (C), by means of Hurst exponent includes a an instability detection unit 304 communicably coupled to an amplitude estimation unit 306, a signal conditioner 326, an analog to digital converter 328, a digital to analog converter 330, and a control unit 332. The signal conditioner 326 is configured to manipulate the signal ($\Phi(j)$) generated by the measuring device 302, such that it meets the requirements of analog to digital convertor 328. In an embodiment, the signal conditioner 326 is configured to amplify the signal ($\Phi(j)$) generated by measuring device 302. Further, if the signal ($\Phi(j)$) generated by the measuring device 302 is analog, the analog to digital convertor 328 coverts the analog signal to digital signal such that the signals ($\Phi(j)$) could be processed in the instability detection unit 304. The instability detection unit 304 operates as per the Hurst exponent algorithm. The amplitude estimation unit 306 obtains the information based on the stability of the combustor (C) from the instability detection unit 304 and estimates the amplitude of oscillations during instability before the combustor (C) exhibits instability. Further, the control unit 332 obtains the information based on the stability of the combustor (C) from the instability detection unit 304 and controls the control parameter of the combustor (C) such that the instability could be avoided. Further, the digital to analog convertor 330 coverts the digital signal obtained as the output from the instability detection unit 304 into the analog signal such that it could be processed by the control unit 332. Further, the control unit 332 obtains the information based on the stability of the combustor (C) from the instability detection unit 304 and controls the control parameter of the combustor (C) such that the instability could be avoided. In an embodiment, the control unit 332 is configured to control the parameters of flow control valve such that the instability could be avoided.

It should be noted that the aforementioned configuration of system 300 is provided for the ease of understanding of the embodiments of the invention. However, certain embodiments may have a different configuration of the components of the system 300 and certain other embodiments may exclude certain components of the system 300. Therefore, such embodiments and any modification by addition or exclusion of certain components of system 300 and without otherwise deterring the intended function of the system 100 as is apparent from this description and drawings are also within the scope of this invention.

Figure 7:
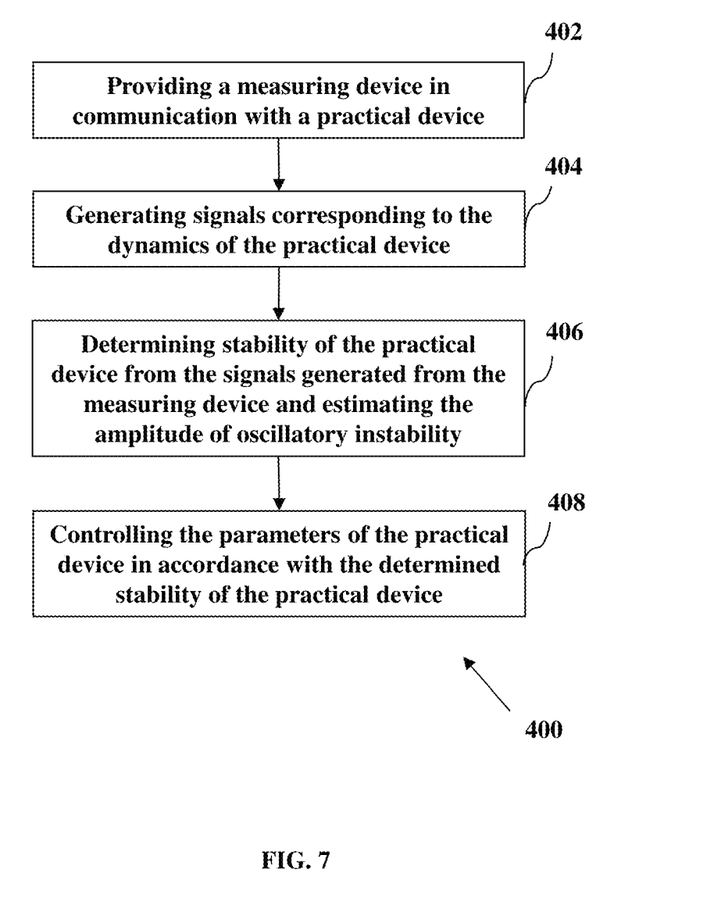
FIG. 7 is a flowchart depicting a method for early detection of onset of oscillatory instabilities in practical devices and controlling various parameters of the device in order to prevent the device from oscillatory instabilities, according to embodiments as disclosed herein.

A method for early detection of onset of oscillatory instabilities in practical devices and controlling various parameters of the device in order to prevent the device from oscillatory instabilities is explained herein below. FIG. 7 is a flow chart depicting a method for early detection of the onset of oscillatory instabilities in practical devices and controlling various parameters of the device in order to prevent the device from oscillatory instabilities using the system. The method 400 includes providing a measuring device in communication with the practical device (step 402); such that signals corresponding to the dynamics of the practical device are generated by the measuring device (step 404). Further, at step 406, the stability of the practical device is identified by the instability detection unit 104 (shown in FIG. 1) and amplitude estimation unit 130 (shown in FIG. 1). In an embodiment, the instability detection unit diagnoses the onset of instabilities, by 0-1 test method. In another embodiment, the instability detection unit diagnoses the onset of instabilities, by counting the number of bursts in the measured signal. In yet another embodiment, the instability detection unit diagnoses the onset of instabilities, by means of the Hurst exponent. Further, various parameters of the practical device is controlled in accordance with the output from the instability detection unit to maintain the combustor under stable operating conditions (step 408).

Figure 8:
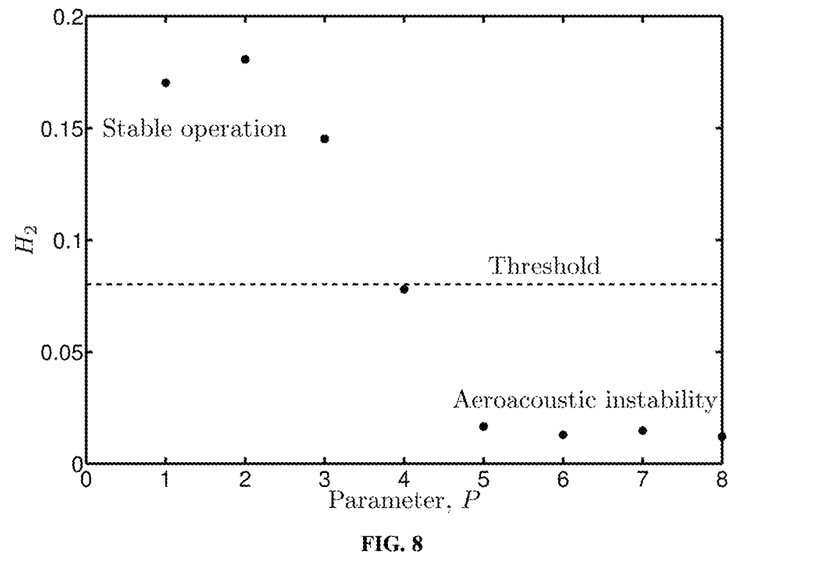
FIG. 8 is a graph depicting a measure based on the Hurst exponent test applied on the dynamic pressure data obtained from an aeroacoustic system in a particular configuration as the parameters are moved towards instability, according to embodiments as disclosed herein.

FIG. 8 is a graph depicting a measure based on the Hurst exponent test applied on the dynamic pressure data obtained from an aeroacoustic system in a particular configuration as the parameters are moved towards instability.

Figure 9:
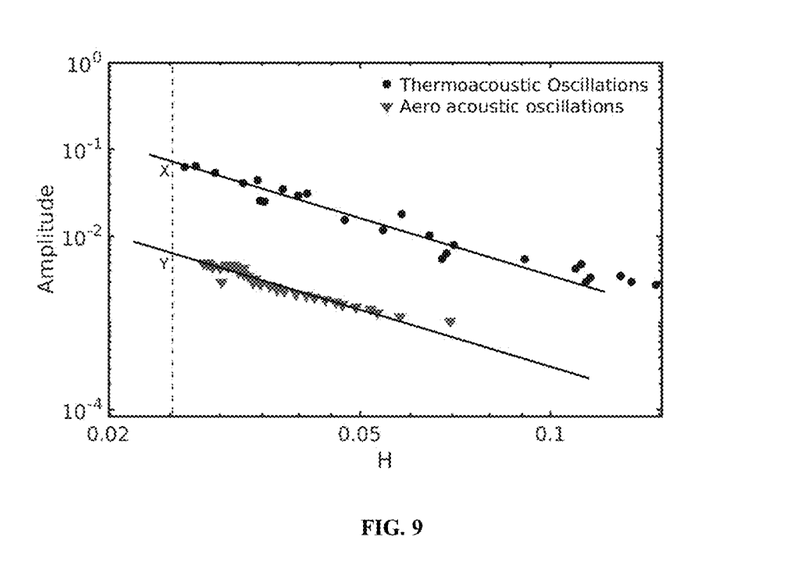
FIG. 9 depicts the variation of Hurst exponent and the amplitude of the frequency of interest for both aero-acoustics and thermoacoustic instability in a log-log plot, according to embodiments as disclosed herein.

FIG. 9 depicts the variation of Hurst exponent and the amplitude of the frequency of oscillatory instability for both aero-acoustics and thermoacoustic instability in a log-log plot, according to the embodiments herein. In FIG. 9, the variation of the Hurst exponent and the amplitude of the frequency of oscillatory instability follows a power law behavior. The exponent of the power law is the slope of the line followed by the graph in FIG. 9. The power law exponent is a constant for different fluid dynamic systems that exhibit onset of oscillatory instability. The graph of FIG. 9 enables prediction of the amplitude of the oscillatory instability corresponding to a critical value of Hurst exponent. The amplitude estimation unit 306 utilizes this graph or this variation to estimate the amplitude of the oscillations during instability through extrapolation of the graph or this variation to a critical value of the Hurst exponent, and identifying the corresponding estimate of the amplitude of the oscillations. The critical value of the Hurst exponent here represents the allowable proximity to the oscillatory instability in the system of interest as can be determined by those skilled in the art. In FIG. 9, points X and Y indicates the estimated amplitude corresponding to thermoacoustic and aero-acoustic instability respectively. The estimated amplitude can be used by those skilled in the art to determine the safety margin of the system.

The foregoing description of the specific embodiments will so fully reveal the general nature of the embodiments herein that others can, by applying the current knowledge, readily modify and/or adapt for various applications such specific embodiments without departing from the generic concept, and, therefore, such adaptations and modifications should and are intended to be comprehended within the meaning and range of equivalents of the disclosed embodiments. For example, although, certain embodiments herein are related to the system and method that utilizes the 0-1 test, burst counter and Hurst exponent methods for early detection of onset of instabilities as they are fast and robust, it should be noted that the system could utilize any other methods that could determine the transition to instability through intermittent bursts. For instance, from the variations in the generalized Hurst exponent data ($H^q$), the Holder spectrum could be constructed. Further, a multifractal spectrum width (W) could be calculated by means of the constructed Holder spectrum. The multifractal spectrum width (W) also has a decreasing trend as the device approaches instability and thereby can be used as an indicator to identify the onset of instability. Another possible indicator to identify the onset of instability could be obtained from what are known as recurrence plots. By a recurrence quantification analysis, quantities such as laminarity, determinism, trapping time and so on could be obtained. These quantities show trends indicative of the transition. Changes in the values of the largest Lyapunov exponent are another useful indicator. Furthermore, although certain embodiments of the invention discloses the system and method for determining impending instabilities in combustor, it should be noted that the system and method as disclosed in the present invention could be used for any other device that is subject to oscillatory instabilities. For example, the generality of the method may be seen in FIG. 8 and FIG. 9 wherein the Hurst exponent test is applied to data acquired from an aeroacoustic system and to estimate the amplitude of oscillatory instability respectively. The test is able to forewarn the onset of oscillatory instabilities well before the actual transition to oscillatory instabilities and also predict the amplitude of the instability. Further, it is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system to determine impending oscillatory instabilities in a device, the system comprising:
    a measuring device (102) configured to generate at least one signal corresponding to dynamics in the device;
    an instability detection unit (104) provided in communication with the measuring device (102); and
    an amplitude estimation unit (130) provided in communication with the instability detection unit (104) and the measuring device (102), configured to estimate an amplitude of the impending oscillatory instabilities,
    wherein, the instability detection unit (104) is configured to diagnose the onset of the impending oscillatory instabilities in the device based on at least one of intermittent bursts in the signal generated by the measuring device (102) before the onset of oscillatory instabilities, or smooth variations in parameters as the device approaches the impending oscillatory instabilities, wherein the intermittent bursts are detected preceding a transition from a noisy or chaotic behavior to the oscillatory instabilities by detecting an increase in the amplitude of the impending oscillatory instabilities using the amplitude estimation unit (130).

2. The system as claimed in claim 1, wherein the system further includes a control unit (106) provided in communication with at least one of the measuring device (102), the instability detection unit (104) and the amplitude estimation unit (130), wherein the instability detection unit (104) is configured to generate control signal corresponding to onset of the impending oscillatory instabilities; and the control unit (106) is configured to control the oscillatory instabilities that proceed through the intermittent bursts based on the control signal.

3. The system as claimed in claim 1, wherein the system is used to detect the impending oscillatory instabilities that proceed through the intermittent bursts in at least one of a combustor, an industrial furnace, a burner, aeroacoustic systems, aero-elastic systems, aeromechanical systems, air-compression systems and any other device subjected to oscillatory instabilities.

4. The system as claimed in claim 3, wherein a digital to analog convertor (120) is integrated with the system to convert at least one digital signal obtained as an output from the instability detection unit (104) to at least one analog signal that could be processed by a control unit (106).

5. The system as claimed in claim 1, wherein the measuring device (102) includes a plurality of sensors that are configured to generate the signal corresponding to the dynamics of the device.

6. The system as claimed in claim 5, wherein the sensor is selected from at least one of an acoustic sensor, a photodiode and a photomultiplier.

7. The system as claimed in claim 1, wherein an analog to digital converter (128) is integrated with the system to convert at least one analog signal generated by the measuring device (102) to at least one digital signal that could be processed by the instability detection unit (104) and the amplitude estimation unit (130).

8. The system as claimed in claim 1, wherein the system determines the proximity of the device to the oscillatory instabilities that proceeds through the intermittent bursts by performing at least one of 0-1 test, Burst count test and Hurst exponent test.

9. The system as claimed in claim 8, wherein the system configured to detect and control the impending oscillatory instabilities in the device by performing the 0-1 test comprises:
   the measuring device (102) provided in communication with the device and configured to generate at least one signal (measured signal) corresponding to the dynamics in the device;
   a signal conditioner (108) in communication with the measuring device (102) and configured to amplify the measured signal generated in the measuring device (102);
   an analog to digital convertor (128) connected to the signal conditioner;
   the amplitude estimation unit (130) in communication with the instability detection unit (104) and configured to estimate the amplitude of the impending oscillatory instability;
   the instability detection unit (104) provided in communication with the analog to digital convertor (128) and the amplitude estimation unit (130), wherein the instability detection unit (104) is configured to generate a value between 0 and 1 based both on the amplitude of instability estimated by the amplitude estimation unit (130) and the proximity of the device to the oscillatory instabilities proceeding through the intermittent bursts in the device;
   at least one digital to analog convertor (120) provided in communication with the instability detection unit (104); and
   the control unit (106) provided in communication with the digital to analog convertor, wherein the instability detection unit (104) is configured to generate a value close to 1 for noisy/chaotic signals and close to 0 for oscillatory dynamics and values in between 0 and 1 for the intermittent bursts.

10. The system as claimed in claim 8, wherein the system configured to detect and control the impending oscillatory instabilities in the device that proceed through the intermittent bursts by performing the Burst count test comprises:
   a measuring device (202) provided in communication with the device and configured to generate at least one signal (measured signal) corresponding to the dynamics in the device;
   a threshold logic circuit (210) having a fixed threshold value for the signal;
   an amplitude estimation logic unit (232), provided in communication with the threshold logic unit (210) and configured to estimate the amplitude of the oscillations during instability, before instability is approached;
   an internal gating circuit (204) provided in communication with the threshold logic circuit (210) and configured to generate a gating signal;
   a comparator (212) provided in communication with the threshold logic circuit (210) and configured to compare measured signal with the fixed threshold value of the signal;
   a counter (216) provided in communication with the threshold logic circuit (210) and configured to count a number of peaks in the at least one signal above the fixed threshold value of the signal; and
   a controller (218) provided in communication with the counter (216) and configured to regulate the functioning of the device, wherein the gating signal controls a time duration of signal acquisition from the device.

11. The system as claimed in claim 10, wherein the system further includes a signal conditioner (208) provided in communication with the measuring device (202) and configured to amplify the measured signal.

12. The system as claimed in claim 10, wherein the controller (218) is configured to regulate the functioning of at least one of operating parameters of the device, such that the device is prevented from the oscillatory instabilities that happen through the intermittent bursts.

13. The system as claimed in claim 8, wherein the system configured to detect and control the impending oscillatory instabilities that proceeds through the intermittent bursts in the device by performing the Hurst exponent test comprises:
   the measuring device (302) provided in communication with the device and configured to generate at least one signal (measured signal) corresponding to the dynamics in the device;
   a signal conditioner (326) in communication with the measuring device (102);
   an analog to digital convertor (328) connected to the signal conditioner;
   the instability detection unit (304) attached to the analog to digital convertor (328);
   an amplitude estimation unit (306) in communication with the instability detection unit (304), configured to obtain information based on the stability of the device from the instability detection unit (304) and to estimate the amplitude of oscillations before the device exhibits instability;

at least one digital to analog convertor (330) connected to the instability detection unit (304); and a second controller (332) attached with the digital to analog convertor;

wherein the instability detection unit (304) is configured to generate a value close to 0 for oscillatory dynamics and values in between 0 and 1 for the intermittent bursts.

14. The system as claimed in claim 1, wherein the system determines an onset of the impending oscillatory instabilities by using a measure that can track the presence of the intermittent bursts in the signal.

15. The system as claimed in claim 1, wherein the system determines the impending oscillatory instabilities that proceeds through the intermittent bursts using at least one of variations in measures of fractality, variations in measures of multifractality, or variations in measures computed through recurrence quantification, for changes in the operating conditions of the device.

16. A method to determine impending oscillatory instabilities in a device, the method comprising:

obtaining, by a measuring device (102), at least one signal (measured signal) corresponding to the dynamics in the device; and estimating, by an amplitude estimation unit (130), an amplitude of at least one of intermittent bursts in the at least one signal corresponding to the dynamics in the device;

diagnosing, through an instability detection unit (104), the impending oscillatory instabilities of the device by utilizing at least one of intermittent bursts in the signal generated by the measuring device (102) and the estimated amplitude, before the onset of oscillatory instabilities or the smooth variations in parameters as the device approaches the impending oscillatory instabilities, wherein the intermittent bursts are detected preceding to a transition from a noisy or chaotic behavior to the oscillatory instabilities.

17. The method as claimed in claim 16, further includes generating using by a control unit (106), a control signal corresponding to the onset of the impending oscillatory instabilities that proceed through the intermittent bursts in the device; and controlling the oscillatory instabilities that proceed through the intermittent bursts based on the control signal.

18. The method as claimed in claim 16, wherein the impending oscillatory instabilities that proceed through the intermittent bursts in the device is diagnosed by performing at least one of 0-1 test, Burst count test and Hurst exponent test.

19. The method as claimed in claim 18, wherein the process of diagnosing the impending oscillatory instabilities in the device by performing the 0-1 test comprises:

generating at least one signal (measured signal) corresponding to the dynamics the device;

amplifying the at least one signal generated in the measuring device (102);

estimating the amplitude of oscillations during the oscillatory instability of the at least one signal;

generating a value between 0 and 1 based on the estimated amplitude of oscillations during oscillatory instability and the proximity of the device to oscillatory instabilities that proceed through the intermittent bursts in the device; and generating a value close to 1 for noisy/chaotic signals and close to 0 for oscillatory dynamics and values between 0 and 1 for the intermittent bursts.

20. The method as claimed in claim 16, wherein the impending oscillatory instabilities in the device that proceed through the intermittent bursts is diagnosed using a measure that can track the presence of the intermittent bursts in the signal.

21. The method as claimed in claim 16, wherein the process of diagnosing the impending oscillatory instabilities by using the intermittent burst produced during the oscillatory instabilities further includes:

providing a threshold logic having a fixed threshold value for the signal;

estimating the amplitude of the intermittent bursts during instability before instability is approached;

providing a gating signal that is configured to control the time duration of signal acquisition from the device;

comparing the measured signal with the fixed threshold value of the signal;

counting the number of peaks in the at least one signal above the fixed threshold value of the signal; and controlling the impending oscillatory instabilities that proceed through the intermittent bursts in the device based on the number of peaks.

22. The method as claimed in claim 16, wherein the impending oscillatory instabilities that proceed through the intermittent bursts of the device is diagnosed using at least one of variations in measures of fractality, variations in measures of multifractality or variations in measures computed through recurrence quantification, for changes in the operating conditions of the device.

23. The method as claimed in claim 16, wherein the process of diagnosing the impending oscillatory instabilities that proceeds through the intermittent bursts in the device comprises performing a Hurst exponent test which generates a value close to 0 for oscillatory dynamics and values in between 0 and 1 for the intermittent bursts.

* * * * *